United States Patent [19]
Quoiffy et al.

[11] 3,938,684
[45] Feb. 17, 1976

[54] COMBINE UNLOADING AUGER DRIVE

[75] Inventors: Harald Quoiffy, Homburg; Norbert Kuhn, Zweibrucken, both of Germany

[73] Assignee: Deere & Company, Moline, Ill.

[22] Filed: Dec. 23, 1974

[21] Appl. No.: 535,414

[30] Foreign Application Priority Data
Jan. 3, 1974  Germany............................ 2400200
Jan. 3, 1974  Germany...................... 7400121

[52] U.S. Cl. .................. 214/521; 198/64; 198/213; 198/232; 214/83.32
[51] Int. Cl.² ......................................... B65G 65/46
[58] Field of Search............. 214/83.36, 83.32, 520, 214/521, 522, 17 D; 198/64, 213, 232, 40; 56/16.6

[56] References Cited
UNITED STATES PATENTS
3,670,913  6/1972  Reaves................................ 214/522
3,721,333  3/1973  Boone.......................... 214/83.32 X Primary Examiner—Albert J. Makay

[57] ABSTRACT

A self-propelled combine has an elevated grain tank with a laterally extending auger in the bottom of the tank for moving grain to an auger type discharge conveyor mounted on the side of the grain tank and swingable between a fore-and-aft transport position and alternate unloading positions wherein it extends outwardly and upwardly from the end of the grain tank auger. The discharge conveyor and grain tank auger are driven by a drive system that includes a clutch selectively actuated by the operator via a control lever at the operator's station and a drive shaft mounted on and connected to the discharge conveyor and connected to the grain tank auger through a pair of universal joints at the axis of articulation of the discharge conveyor. An interlock device is provided between the control lever and the discharge conveyor, so that the clutch can be engaged to drive the discharge conveyor only when the discharge conveyor is in its extended or unloading position.

10 Claims, 6 Drawing Figures

COMBINE UNLOADING AUGER DRIVE

BACKGROUND OF THE INVENTION

The invention relates to a combine with a swiveling grain tank discharge conveyor which is connected, through a universal joint disposed in the pivot axis of the discharge conveyor, to a feeder auger disposed in the grain tank and more particularly to an improved drive for driving the discharge conveyor and controls for said drive.

It is known in combines to connect an operating lever disposed near the driver's seat for the actuation of a drive mechanism for a discharge auger type conveyor of a grain tank disposed on the combine, a hydraulic cylinder being utilized to position the discharge conveyor. One end of the hydraulic cylinder is connected to the combine and the other end to the discharge conveyor, and a relocation of the discharge conveyor into a transport position can be brought about by retracting the hydraulic cylinder.

It is also known to drive a discharge auger type conveyor from the feeder or grain tank auger through universal joints at the axis of articulation of the discharge conveyor. However, when the discharge conveyor is swung back to the fore-and-aft or transport position, the drive line at the universal joints makes an approximately 90° turn, and it is undesirable to drive the discharge conveyor through such a sharp angle.

SUMMARY OF THE INVENTION

According to the present invention, an interlock device is provided between the discharge conveyor for a combine grain tank and the control lever that controls the drive for the discharge conveyor, to prevent the driving of the conveyor when the conveyor is in such a position that damage could occur to the conveyor drive system.

More specifically, a clutch is provided in the drive for the discharge conveyor, and the interlock is connected to the clutch-actuating means for preventing engagement of the clutch when the discharge conveyor is not in an extended unloading position wherein the drive cannot be damaged.

Still more specifically, a cam is mounted on the discharge conveyor for swinging therewith, and the interlock includes a cam follower that engages the cam and is shiftable thereby in response to movement of the discharge conveyor, the cam follower being connected to the linkage for shifting the clutch in the discharge conveyor drive.

Still another feature of the invention resides in the fact that the discharge conveyor, conventionally an auger type conveyor, is swingable between alternate unloading positions to load different portions of the grain receiving vehicle alongside the combine or to accommodate different positions of the vehicle, and the interlock means permits shifting of the discharge conveyor within a range of alternate unloading positions, wherein the conveyor drive can be operated without damaging the universal joints in the conveyor drive.

Still another feature of the invention resides in the simple and rugged construction of the discharge conveyor drive and the interlock device for protecting the drive.

DESCRIPTION OF THE PREFERRED EMBODIMENT

Figure 1:
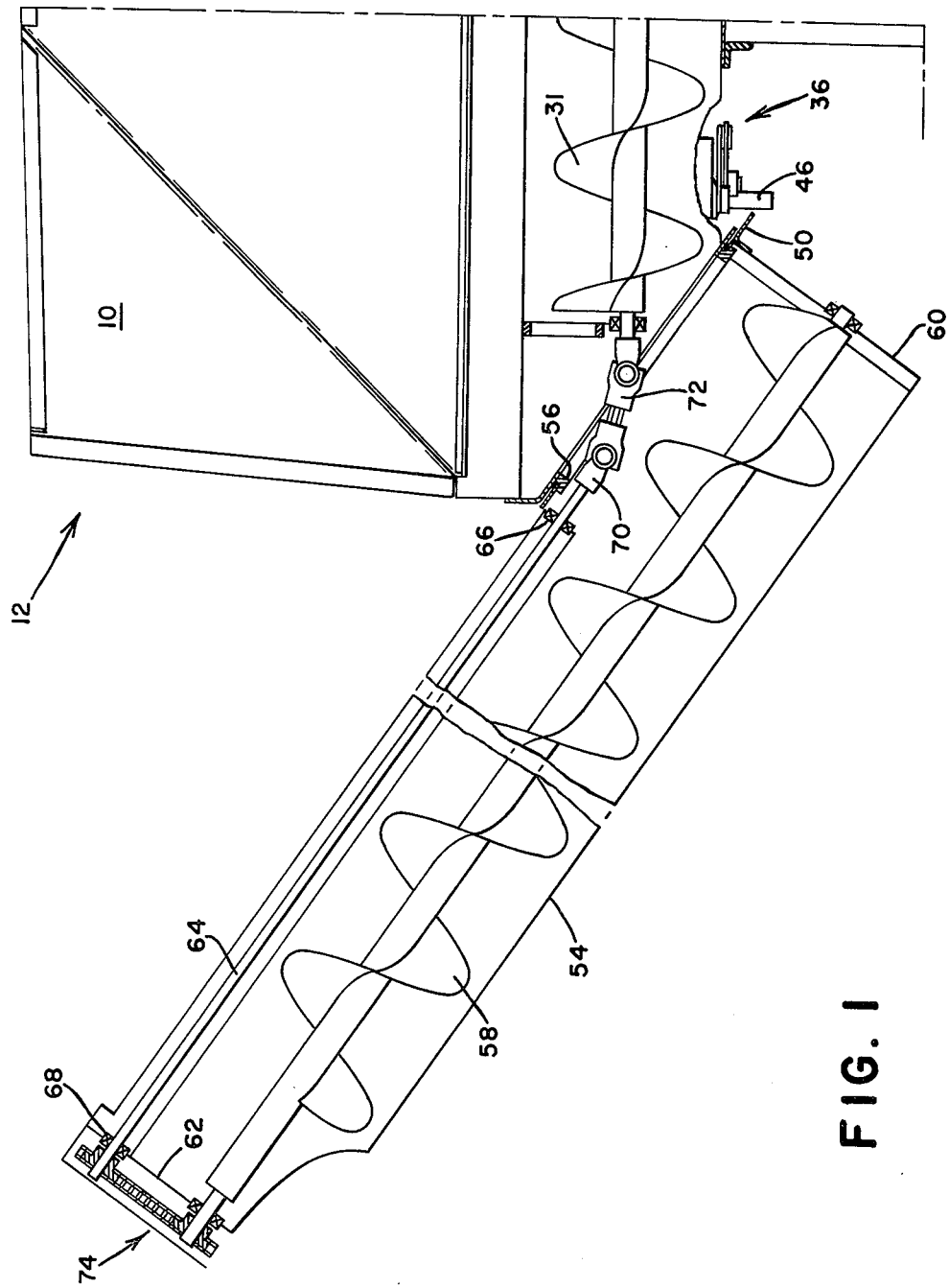
FIG. 1 is a partly schematic rear elevation view of a combine's grain tank, shown only in part, with a laterally extending discharge conveyor, including one embodiment of the invention.
Figure 2:
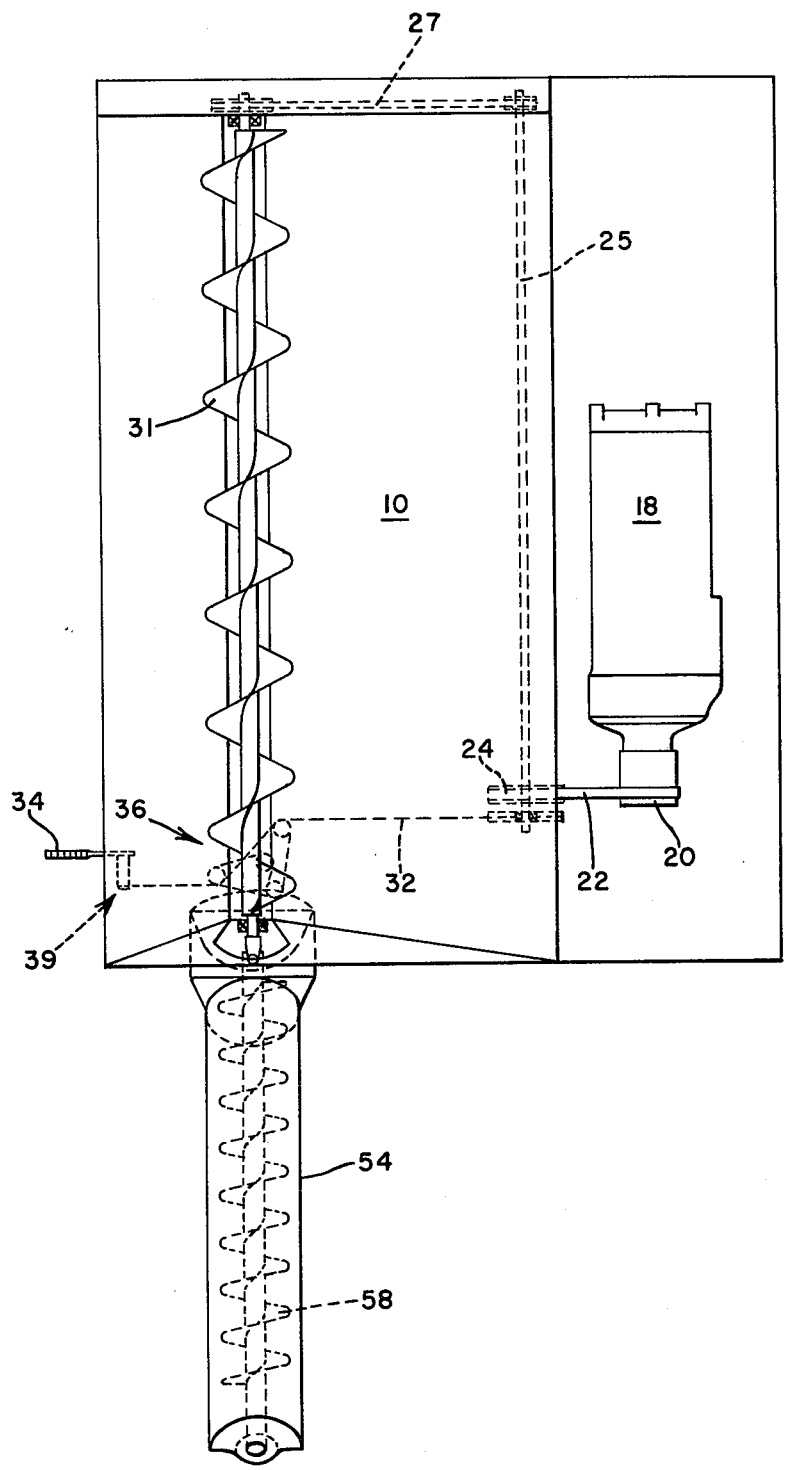
FIG. 2 is a top plan view of the grain tank and discharge conveyor shown in FIG. 1.

FIG. 1 of the drawing shows only a part of a grain tank 10 of a combine 12. In the embodiment according to FIG. 4, the grain tank is located behind a driver's seat 14 above the drive wheels 16 of the combine. The combine 12 as well as its various threshing and cleaning members are driven by a combustion engine 18 disposed behind the grain tank 10. At its left end, with reference to the driving direction, the combustion engine has a driven pulley 20 in driving connection with a driving pulley 24 through a belt 22. The driving pulley 24 is mounted on a shaft 25 in driving connection with a feeder auger 31 through a chain drive 27. To be able to disrupt the drive connection between the driven and the driving pulley without trouble, the shaft 25 is mounted in a rocker 26, which is attached below the grain tank 10 to the combine through pivotable parallel guide bars 28 and 30. The forward end of the rocker is connected, according to FIG. 2 by a pulling cable 32 to an operating lever 34 provided near the combine's driver's seat for actuation of the rocker 26. The operating lever 34, the combustion engine and the drive elements for the feeder auger 31 disposed in the grain tank 10 are identical in both the first and second embodiment so that the same reference symbols were used for all identical parts in both embodiments.

Figure 4:
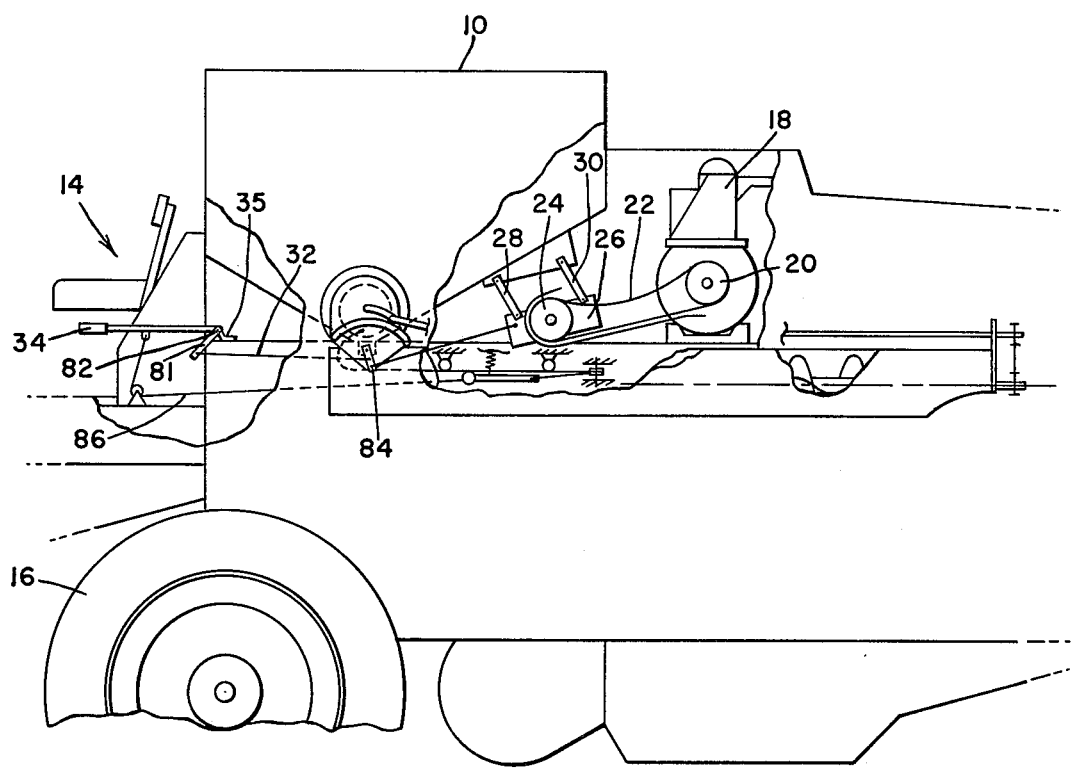
FIG. 4 is a partly schematic side elevation view of a combine showing a second embodiment of the invention.

The operating lever 34 shown in FIG. 4 is pivoted in a mount 35 provided on the combine and can be locked in various positions. In the area where the operating lever 34 is articulated a small lever 39 is connected to the operating lever 34. The pulling cable 32, which interconnects the rocker 26 and the lower free end of the lever 39, engages a compensator or take-up mechanism designed in the form of a rocking lever 36.

The rocking lever 36 consists of an angular lever having in its center a pivot pin 38, pivoted in a mount 40 provided on the combine. One leg of the rocking lever 36 carries a first deflection roller 42 and the other leg of the rocking lever a second deflection roller 44. At the apex of the two legs of the rocking lever 36 is a cam follower 46, which follows a cam plate 50.

The cam plate 50 is disposed on a discharge conveyor tube 54 pivoted on the side of the grain tank. To pivot the discharge tube, say, from its discharge position shown in FIG. 1 into a transport position shown in FIG. 5, the discharge tube is rotatably connected to the discharge end of a feeder auger 31 in the bottom of the grain tank by means of an annular flange 56. The discharge tube encloses a discharge auger 58 rotatably mounted in a lower plate 60 closing off the discharge tube and an upper plate 62. The discharge auger is driven by a drive shaft 64, which is eccentrically disposed in the housing and rotatably mounted in two bearings 66 and 68 respectively fixed to the discharge tube 54. The lower end of the shaft 64 is linked via two universal joints or knuckle joints 70 and 72 to the discharge end of the feeder auger 31. The upper end of shaft 64 is in driving connection with the upper end of the discharge auger 58 through a chain drive or gearing 74.

Figure 3:
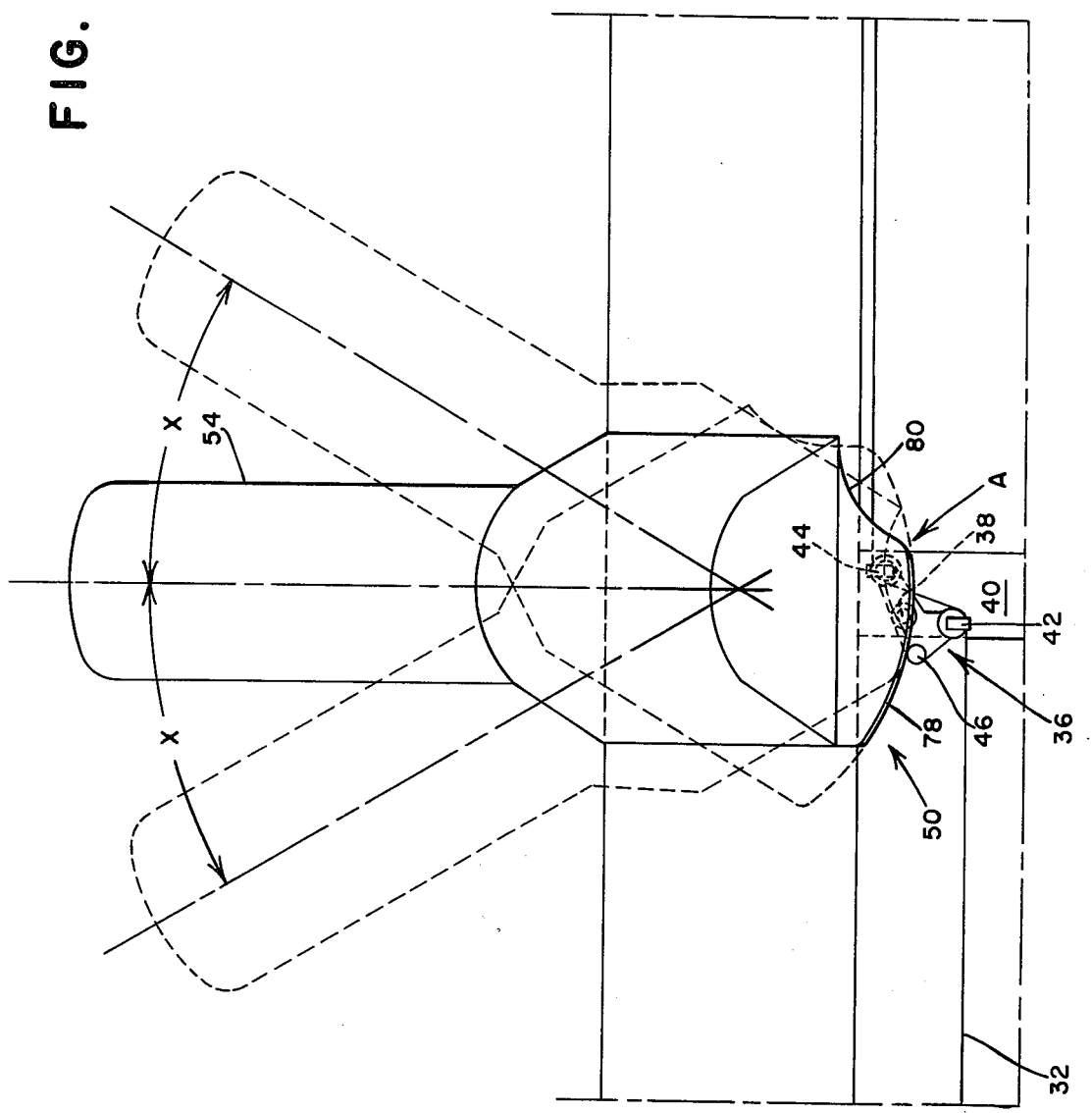
FIG. 3 is schematic plan view of the discharge conveyor shown in FIG. 1, with alternate operating positions of the conveyor shown in dotted lines.

As FIG. 3 shows, the discharge tube can be pivoted over a wide angular range, given by the angle alpha, without thereby having to be afraid of damaging the universal joints 70 and 72. The harvested material can thus be distributed better over a loading vehicle.

In order to avoid damage when the drive system for the discharge auger 58 is turned on and when moving the discharge tube 54 beyond the indicated angular range, the drive mechanism can be stopped automatically by the compensator or the rocking lever 36 after a predetermined positioning process. The rocking lever can be swung into two positions for this purpose. In one position (see FIG. 3) the rocking lever is turned counterclockwise so that the pulling cable 32 is taut, thus keeping the rocker 26 in a forward position relative to the travel direction according to FIG. 2, in which position the belt 22 is taut. To be able to swing the lever 36 into a second position after a predetermined pivoting process, the cam plate 50 presents a convex portion 78 and a concave portion 80. Both the convex portion 78 and the concave portion 80 are arched. In the area of the transistion from the convex portion 78 to the concave portion 80 a starting or stopping action takes place. This means that as long as the cam follower runs along the guide surface of the concave portion, the rocker arm 36 remains in its first position in which the pulling cable is taut. When the cam follower 46 reaches point A, which is the transition between the convex and the concave portions, the rocker arm is shifted clockwise so that the pulling cable 32 runs approximately in a straight line between the operating lever 34 and the rocker 26 as well as the two deflection rollers 42 and 44. The pulling cable having assumed an approximately straight position, the rocker 26 is shifted into a rear position according to FIG. 4, whereby the belt 22 is slackened. The rocker 26 may also be shifted, for example, by a spring not shown in the drawing. In addition, it is possible to bring about, by appropriately linking the parallel guide rods 28 and 30 to the combine, a shifting of the rocker 26 due to the rocker's own weight or due to the pulling force of the belt 22, adequate to interrupt the drive connection between the driven pulley 20 and the driving pulley 24.

The longer the guide surface of the convex cam portion, the longer is the distance over which the discharge tube 54 pivots in the On condition. As is evident from FIG. 3, the cam follower 46 in the discharge position of the discharge tube 54 rests approximately against the middle of the convex cam portion 78. It is thus possible to move the discharge tube 54 between the two angles alpha per FIG. 3 without damage to the universal joints 70 and 72 occurring.

If, for example, the discharge tube is swung from its transport position into its discharge position, the cam follower 46 slides along the guide surface of the concave cam portion 80. As long as the cam follower 46 slides along the concave cam portion 80, the pulling cable 32 is in slack condition and the stroke of the operating lever 34 is then insufficient to bring about a shifting of the rocker 26. When the cam follower 46 reaches point A, the pulling cable 32 becomes taut again and the driving connection is automatically re-established.

Figure 5:
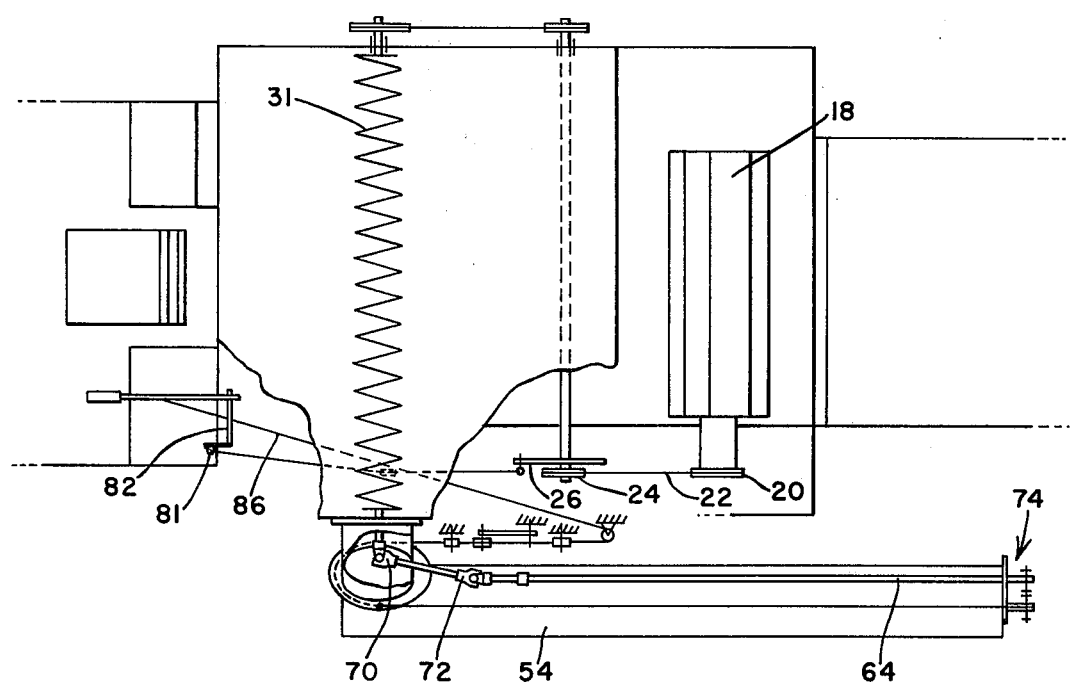
FIG. 5 is a schematic top plan view of FIG. 4.
Figure 6:
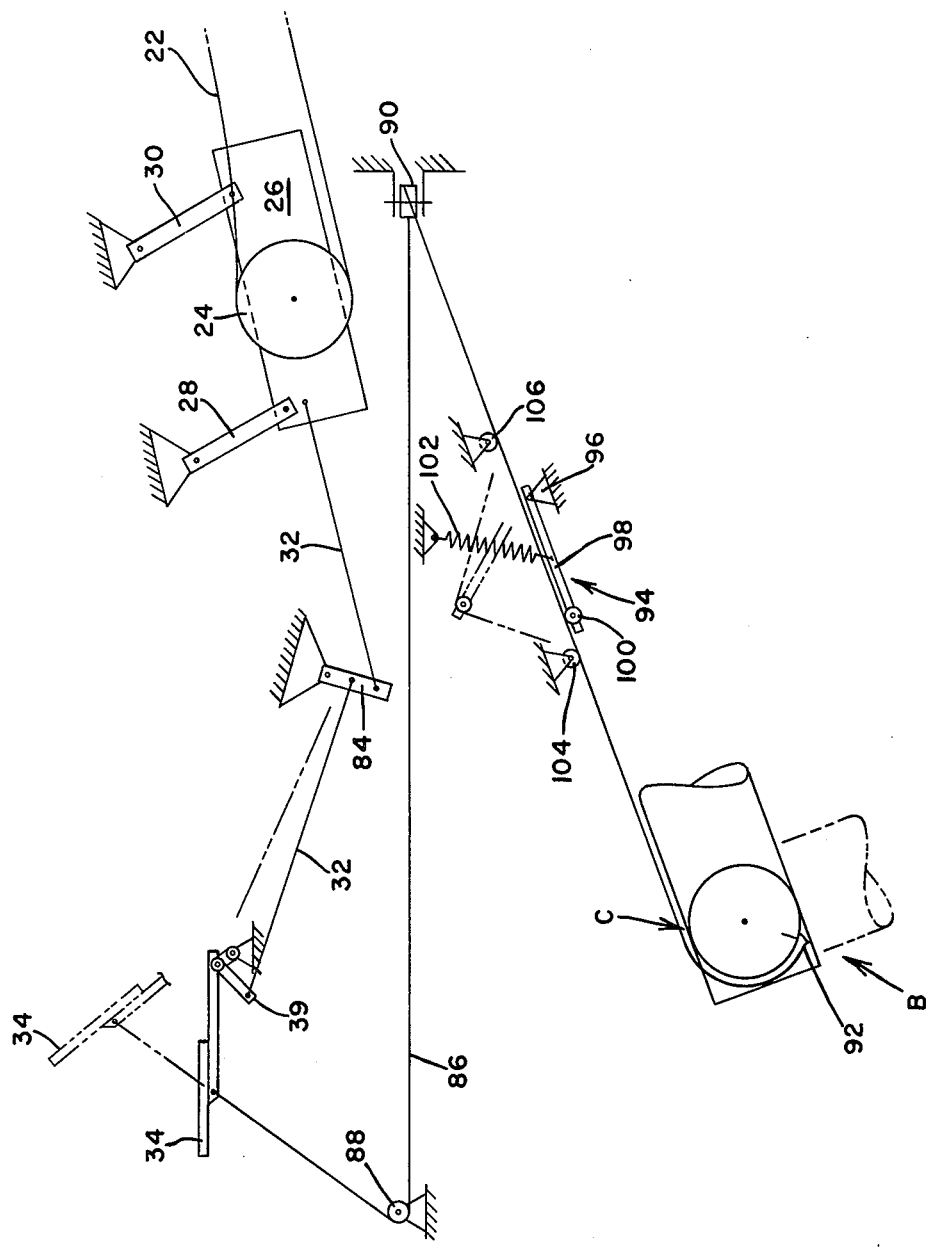
FIG. 6 is a schematic layout of the embodiment shown in FIGS. 4 and 5, the discharge position of the discharge conveyor being indicated by dash-dotted lines.

FIGS. 4 to 6 show another embodiment of the invention. Stopping the drive mechanism is again accomplished by the pulling cable 32 which, for this purpose, is connected at one end to the rocker 26 and at the other end to a lever 81 attached to a rock shaft 82, rockable via the operating lever 34. According to FIG. 4, the pulling cable 32 may be divided approximately in the middle and engage a unilateral lever arm 84. By pivoting the operating lever 34 per FIG. 6 from its position shown in dash-dotted lines into a position shown in full lines, the rocker 26 moves to the rear relative to the travel direction, thereby slackening the belt 22.

Another pulling cable 86 is fastened ahead of the shaft 82 of the operating lever 34 to the upper end of the operating lever and led around a first deflection roller 88 and around a second deflection roller 90, both of which are mounted on the combine. The other end of the pulling cable 86 is fastened to the discharge tube 54 and secured to it by means of a fastening device 92. If, for example, the discharge tube 54 is swivelled from the position shown in dash-dotted lines in FIG. 6 into the position shown in full lines, the pulling cable will wind itself on the discharge tube, thereby shifting the operating lever 34 into the position shown in full lines. Due to this process the pulling cable 32 is slackened at the same time, and the rocker 26 is shifted so as to interrupt the driving connection. Thus, the area between B and C as well as the fastening device 90 form the positioning member to shift the operating lever 34. The design of the discharge tube 54 in the area B and C is such that when the discharge tube 54 is swung in, the operating lever 34 is also pulled completely into its lowest position. This assures that the drive mechanism cannot be started erroneously.

Again, a take-up device or compensator 94, formed of a lever 98 pivoted in a mount 96 provided on the combine and a guide roller 100 provided at the compensator's outer end, is located between the discharge tube 54 and the second deflection roller 90. So that the guide roller 100 will always rest against the pulling cable 86, there is provided between the guide roller 100 and the mount 96 an attachment point for a tension spring 102, which turns the lever 98 clockwise, with reference to FIG. 6. A third guide roller 104 mounted on the combine is located in front of the deflection roller 100 and a fourth guide roller 106 is disposed behind the mount 96. If, for example, the discharge tube is pivoted slightly out of its transport position, the lever 98 will turn clockwise due to the tension spring 102, automatically tightening the pulling cable 86. It is thus assured that no automatic actuation of the operating lever 34 will occur. The length of the positioning member between B and C is proportional to the stroke length of the operating lever 34. It can be made certain in this manner that the operating lever 34 can be shifted only after the discharge tube 54 has been moved sufficiently that, and into a position in which, damage to the universal joints 70 and 72 is no longer possible.

The second deflecting roller 90 may also be designed as a tightening roller. This assures that the operating lever 34 always assumes its lowest position when the discharge tube 54 is in transport position. Manufacturing tolerances of the entire device can thus be compensated.

We claim:

1. In a combine having an operator's station, a power source, and a grain tank, including a feeder auger on the bottom of the grain tank for moving grain from the grain tank to a discharger auger-type conveyor mounted on one side of the grain tank in crop-receiving relationship with the feeder auger and swingably mounted thereon for swinging between a generally fore and aft transport position and a range of unloading positions wherein the conveyor extends generally laterally outwardly and upwardly from the grain tank, the improvement comprising; a drive means operatively connected to the feeder auger and the discharge conveyor and including a clutch means selectively engageable to drivingly connect the feeder auger and the discharge conveyor to the power source; a clutch actuating means operatively associated with the clutch means for controlling the engagement of the clutch means and including a control lever mounted at the operator's station and shiftable between clutch engaging and clutch disengaging positions; and interlock means operatively connected to the clutch actuating means and the discharge conveyor for preventing engagement of the clutch means when the discharge conveyor is not in one of its unloading positions.

2. The invention defined in claim 1 wherein the clutch actuating means includes linkage means connecting the control lever to the clutch means and the interlock means includes a sensing element operatively connected to the discharge conveyor for shifting between first and second conditions in response to the shifting of the discharge conveyor between its unloading and transport positions, and means connecting the sensing element to the linkage means for shifting the clutch means to its disengaged condition when the sensing element is shifted to its second condition.

3. The invention defined in claim 2 wherein the interlock means includes a cam member mounted on the discharge conveyor and shiftable therewith and the sensing element comprises a cam follower operatively engaging the cam member for shifting between the alternate conditions in response to movement of the cam member with the discharge conveyor between the transport and unloading positions.

4. The invention defined in claim 3 wherein the linkage means includes a flexible element operative to connect the control lever to the clutch means to cause clutch engagement only when under tension, and shiftable tensioning means connected to the flexible element and operatively connected to the cam follower to remove the tension from the flexible element when the cam follower shifts to its second condition.

5. The invention defined in claim 4 wherein the tensioning means includes a rockable lever carrying a pair of rollers engaging the flexible element and the cam follower.

6. The invention defined in claim 3 wherein the cam member includes a convex portion mounted on the discharge conveyor generally concentric with the pivot axis of the conveyor, the cam follower engaging the convex portion when the conveyor is in its unloading positions.

7. The invention defined in claim 1 wherein the interlock means includes a flexible element having one end connected to the control lever and the other end connected to the discharge conveyor and operative to shift the control lever to its clutch disengaging position when the discharge conveyor moves to its transport position.

8. The invention defined in claim 1 wherein the discharge conveyor includes an auger and the drive means includes a drive shaft parallel to the discharge conveyor auger and universal joint means interconnecting the drive shaft to the feeder auger and disposed at the pivot axis of the discharge conveyor.

9. The invention defined in claim 8 wherein the drive means includes means for drivingly connecting the outer end of the drive shaft to the outer end of the discharge conveyor auger.

10. The invention defined in claim 9 wherein the clutch actuating means includes linkage means connecting the control lever to the clutch means and the interlock means includes a sensing element operatively connected to the discharge conveyor for shifting between first and second conditions in response to the shifting of the discharge conveyor between its unloading and transport positions, and means connecting the sensing element to the linkage means for shifting the clutch means to its disengaged condition when the sensing element is shifted to its second condition.

* * * * *